United States Patent
Moore et al.

(10) Patent No.: US 8,069,156 B2
(45) Date of Patent: Nov. 29, 2011

(54) METHOD AND SYSTEM FOR PRUNED RESILVERING USING A DIRTY TIME LOG

(75) Inventors: William H. Moore, Fremont, CA (US); Jeffrey S. Bonwick, Los Altos, CA (US); Matthew A. Ahrens, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/707,290

(22) Filed: Feb. 17, 2010

(65) Prior Publication Data

US 2010/0145919 A1      Jun. 10, 2010

Related U.S. Application Data

(63) Continuation of application No. 11/409,427, filed on Apr. 19, 2006.

(60) Provisional application No. 60/734,023, filed on Nov. 4, 2005.

(51) Int. Cl.
*G06F 7/00* (2006.01)

(52) U.S. Cl. ........................................ 707/703; 711/170

(58) Field of Classification Search .................. 707/703, 707/704

See application file for complete search history.

(56) References Cited

U.S. PATENT DOCUMENTS

| | | | | | |
|---|---|---|---|---|---|
| 5,274,803 | A | * | 12/1993 | Dubin et al. | 398/600 |
| 6,536,033 | B1 | * | 3/2003 | Weerawarana et al. | 717/108 |
| 6,820,098 | B1 | * | 11/2004 | Ganesh et al. | 707/202 |
| 6,981,114 | B1 | * | 12/2005 | Wu et al. | 711/162 |
| 7,024,593 | B1 | * | 4/2006 | Budd et al. | 714/48 |
| 7,039,661 | B1 | * | 5/2006 | Ranade | 707/204 |
| 7,340,640 | B1 | * | 3/2008 | Karr et al. | 714/6 |
| 2003/0084242 | A1 | * | 5/2003 | Strange et al. | 711/114 |
| 2004/0030822 | A1 | * | 2/2004 | Rajan et al. | 711/4 |

OTHER PUBLICATIONS

Tsotras et al., "Efficient Management of Time-Evolving Databases", Aug. 1995.*

* cited by examiner

*Primary Examiner* — Shahid Alam
*Assistant Examiner* — Dawaune Conyers
(74) *Attorney, Agent, or Firm* — Osha • Liang LLP (57) ABSTRACT

A computer readable medium including executable instructions for resilvering a hierarchical block tree in a storage pool. Resilvering the hierarchical block tree involves determining that a birth time of a parent block of a branch is greater than or equal to a lowest birth time on a dirty time log (DTL) and selectively traversing child indirect blocks in the branch to obtain a child data block, where each of the child indirect blocks includes a block pointer, a data checksum, and a birth time for a referenced block, where the birth time of each of the child indirect blocks is no greater than the birth time of the parent block. Resilvering the hierarchical block tree further involves resilvering the child data block when the DTL includes a birth time of the child data block, where one of the child indirect blocks includes the birth time of the child data block.

17 Claims, 8 Drawing Sheets

METHOD AND SYSTEM FOR PRUNED RESILVERING USING A DIRTY TIME LOG

CROSS-REFERENCE TO RELATED APPLICATIONS

This application is a continuation of U.S. patent application Ser. No. 11/409,427, entitled: "METHOD AND SYSTEM FOR PRUNED RESILVERING USING A DIRTY TIME LOG", and filed on Apr. 19, 2006. Further, this application claims benefit from U.S. patent application Ser. No. 11/409,427 under 35 U.S.C. §120, which is hereby incorporated by reference in its entirety. U.S. patent application Ser. No. 11/409,427 claims benefit of U.S. Provisional Application Ser. No. 60/734,023 filed on Nov. 4, 2005, entitled "DIRTY TIME LOGGING AND RESILVERING" in the names of William H. Moore and Jeffrey S. Bonwick.

This application is related to copending U.S. patent application Ser. No. 11/407,773, filed on Apr. 19, 2006 and entitled "Method and System for Dirty Time Logging," copending U.S. patent application Ser. No. 11/407,744, filed on Apr. 4, 2006 and entitled "Method and System for Dirty Time Log Directed Resilvering," and copending U.S. patent application Ser. No. 11/407,719, filed on Apr. 19, 2006 and entitled "Method and System for Metadata-Based Resilvering," the entire contents of which are incorporated herein by reference. All the above referenced applications are co-owned by the same assignee.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; and "Automatic Conversion of All-Zero Data Storage Blocks into File Holes" (application Ser. No. 10/853,915) filed on May 26, 2004.

BACKGROUND

Typical computer systems include a file system for storing and accessing files. In addition to storing system files (operating system files, device driver files, etc.), the file system provides storage and access of user data files. If any of these files (system files and/or user files) contain critical data, then it becomes advantageous to employ a data backup scheme to ensure that critical data are not lost if a file storage device fails. One data backup scheme that is commonly employed is mirroring. Mirroring involves maintaining two or more copies of a file, where each copy of the file is located on a separate file storage device (e.g., a local hard disk, a networked hard disk, a network file server, etc.).

When one or more file storage devices fails for any length of time, the file storage device(s) may become unsynchronized. However, when employing a mirroring scheme, it is of critical importance to ensure that the mirrors are synchronized (i.e., that the contents of each mirror are the same). If a mirror becomes unsynchronized, the simplest recovery scheme involves copying all of the data from a synchronized mirror to the unsynchronized mirror. However, copying all data from one file storage device to another file storage device may take a long time and reduce performance of the file storage devices significantly during the resynchronization process.

Alternatively, dirty region logging (DRL) may be used to facilitate resynchronization. DRL involves dividing each mirror into a number of "regions." Depending on the implementation, the region may be as small as a single disk sector or larger than 256 kilobytes (KB). Prior to modifying the content of a region—for example, when there is a write operation on data within the region—a DRL entry for the region is created in the DRL. In most cases, the DRL entry merely identifies the region where the modification will be attempted. If the region is modified successfully, then the DRL entry is cleared. If the region is not modified successfully, then the DRL entry remains in the DRL. Thus, during a resynchronization process, the DRL may be used to identify which specific regions require resynchronization, rather than resynchronizing the entire file storage device.

Dirty region logging may be more time-efficient then resynchronizing an entire file storage device. However, it also includes system overhead with each modification to a region, since the DRL must be updated prior to each modification to the region. Clearly, this overhead increases with smaller region sizes. Conversely, if the regions are large, there may be significant overhead involved in resynchronizing an entire region, even though only a single disk sector in that region may have been modified.

SUMMARY

In general, in one aspect, the invention relates to a computer readable medium comprising executable instructions for resilvering a hierarchical block tree in a storage pool by traversing a branch of the hierarchical block tree only if a birth time of a parent block of the branch is greater than or equal to a lowest birth time on a dirty time log(DTL), and resilvering a child block in the branch only if the DTL comprises a birth time of the child block.

In general, in one aspect, the invention relates to a computer readable medium comprising executable instructions for resilvering a hierarchical block tree in a storage pool by obtaining a birth time of each child block referenced by a parent block in the hierarchical block tree, and for each child block a) resilvering the child block if a dirty time log (DTL) comprises the birth time of the child block, and b) if the birth time of the child block is greater than or equal to a lowest birth time on the DTL, obtaining a birth time of each grandchild block referenced by the child block, if the child block is an indirect block, and repeating a) and b) for each grandchild block, if the child block is an indirect block.

In general, in one aspect, the invention relates to a system. The system comprises a hierarchical block tree in a storage pool, comprising a parent block of a branch of the hierarchical block tree, and a child block in the branch. The system further comprises a dirty time log (DTL), and a file system configured to traverse the branch only if a birth time of the parent block is greater than or equal to a lowest birth time on the DTL, and resilver the child block only if the DTL comprises a birth time of the child block.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to resilver a hierarchical block tree in a storage system. Specifically, embodiments of the invention relate to resilvering a hierarchical block tree by only traversing those branches of the tree that could potentially include blocks requiring resilvering (i.e., blocks having a birth time listed in a dirty time log).

Figure 1:
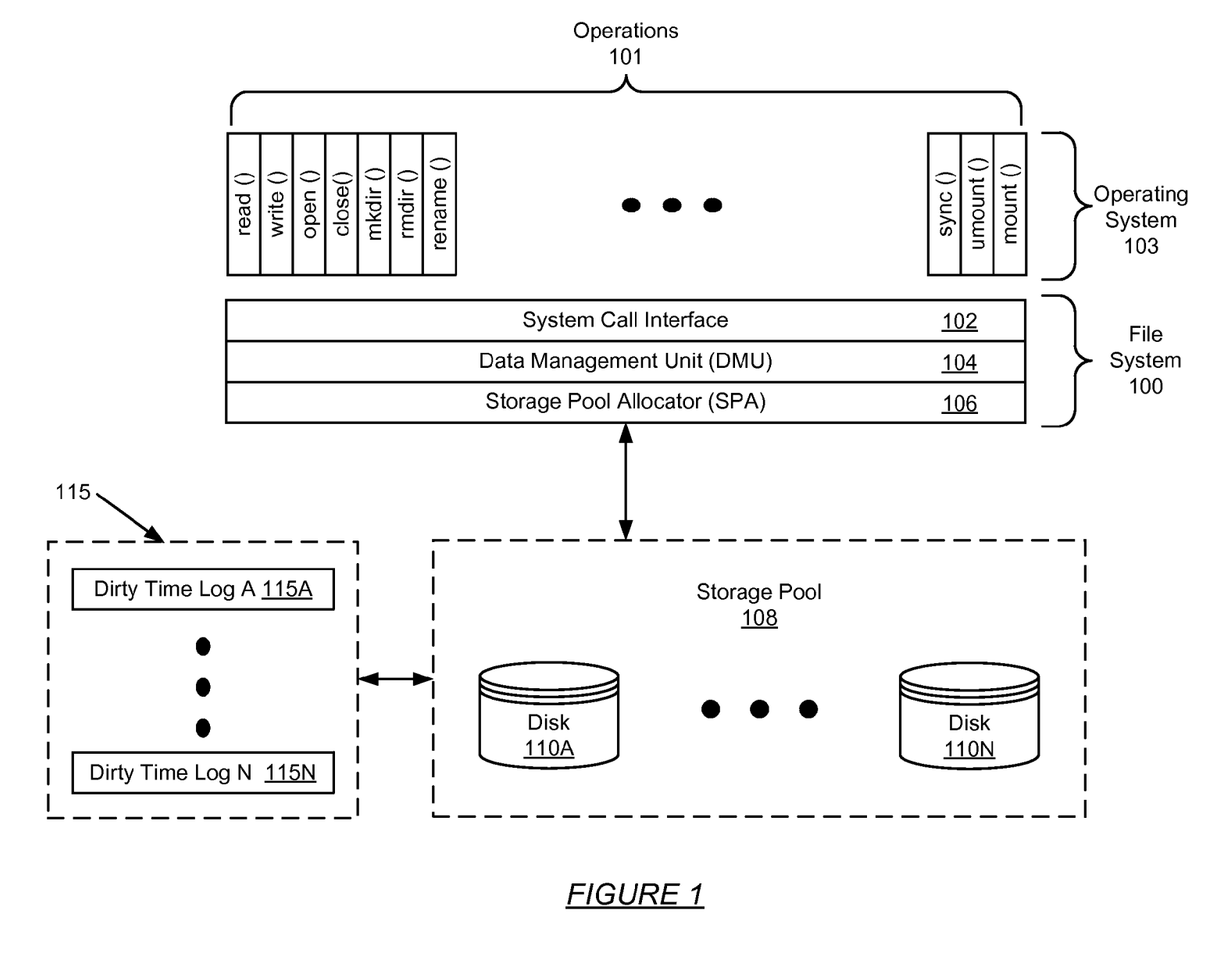
FIG. 1 shows a diagram of a system architecture in accordance with one embodiment of the invention.

FIG. 1 shows a diagram of a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into input/output (hereinafter "I/O") requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A, 110N)). Further, in one embodiment of the invention, the storage capacity of the storage pool (108) may increase and decrease dynamically as physical disks are added and removed from the storage pool (108). In one embodiment of the invention, the storage space available in the storage pool (108) is managed by the SPA (106).

As shown in FIG. 1, each of the disks (110A, 110N) in the storage pool (108) is associated with a dirty time log (DTL) (115A, 115N). In one embodiment of the invention, the DTL (115A, 115N) tracks the times during which I/O requests were not successfully completed (i.e., the data were not stored on the disk (110A, 110N)). For example, if the disk (e.g., 110A, 110N) goes offline from 10:00 am until 10:15 am, then the DTL (e.g., 115A, 115N) for the disk (e.g., 110A, 110N) will include an entry stating that the disk (e.g., 110A, 110N) was offline from 10:00 am until 10:15 am.

As an alternative to storing the actual time that the disk (e.g., 110A, 110N) was offline, each I/O request issued to the storage pool (108) may be associated with a transaction group number. Thus, instead of storing the actual time the disk (e.g., 110A, 110N) was offline, the DTL (e.g., 115A, 115N) may store the transaction group number(s) during which the disk (e.g., 110A, 110N) was offline. More specifically, the DTL (e.g., 115A, 115N) may store the transaction group number(s) during which I/O requests were not successfully completed for the disk (e.g., 110A, 110N). Accordingly, the use of "birth time" in the following descriptions may refer to either a time or a transaction group number.

Those skilled in the art will appreciate that a single DTL may be maintained for the entire storage pool (108), where each entry identifies the particular disk (e.g., 110A, 110N) and when the disk (e.g., 110A, 110N) was offline. In addition, those skilled in the art will appreciate that the DTLs (e.g., 115A, 115N) may be stored in any location in the system (e.g., in the storage pool (108), in memory, etc.). In one embodiment of the invention, the SPA (106) manages the DTL (e.g., 115A, 115N) (i.e., updates the contents of the DTL (e.g., 115A, 115N), etc.).

Figure 2:
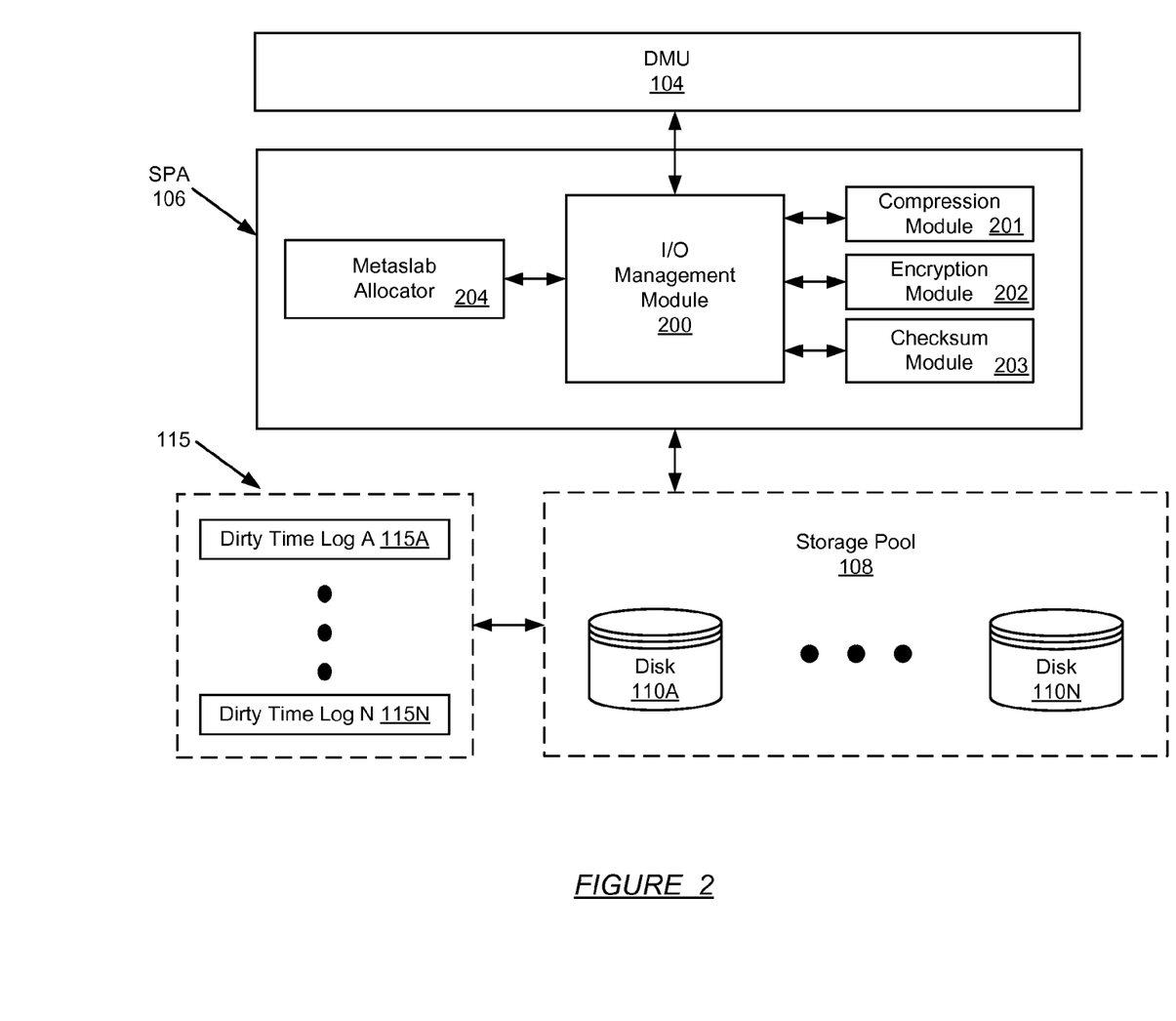
FIG. 2 shows a diagram of a storage pool allocator in accordance with one embodiment of the invention.

FIG. 2 shows a diagram of the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups, in accordance with one embodiment of the invention. The compression module (201) provides functionality to compress larger logical blocks (i.e., data blocks and indirect blocks) into smaller segments, where a segment is a region of physical disk space. For example, a logical block size of 8 KB may be compressed to a size of 2 KB for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool (108). The checksum may be used, for example, to ensure data has not been corrupted.

As discussed above, the SPA (106) provides an interface to the storage pool (108) and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool (108) by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
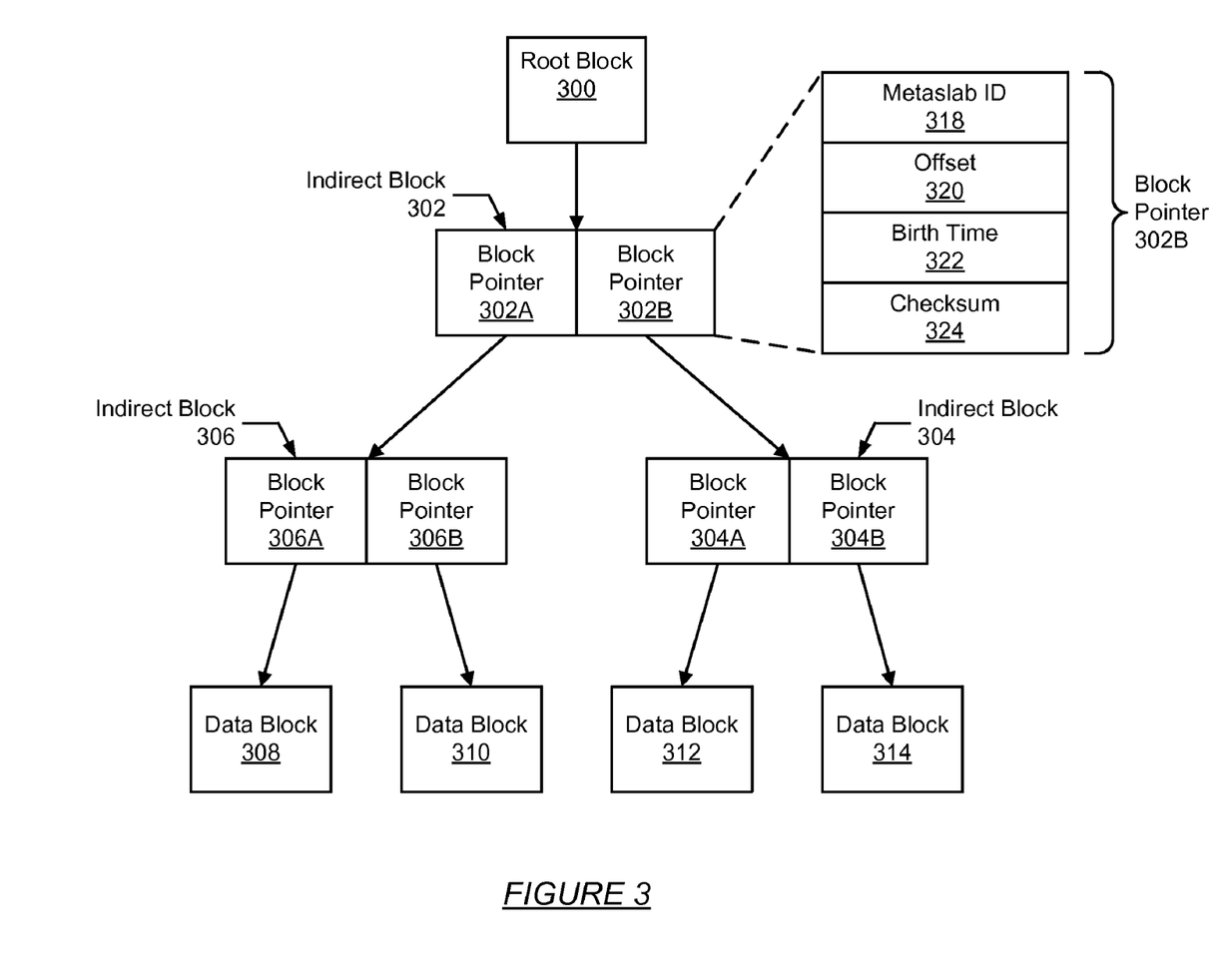
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows a diagram of a hierarchical data configuration (hereinafter referred to as a "tree") for storing data blocks and indirect blocks within a storage pool (e.g., 108 in FIG. 1) in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (302A, 302B, 304A, 304B, 306A, 306B) that, directly or indirectly, reference data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks (302, 304, 306) and data blocks (308, 310, 312, 314) may be located anywhere in the storage pool. In one embodiment of the invention, the root block (300) and each block pointer (302A, 302B, etc.) include data as shown in the expanded diagram of block pointer (302B). One skilled in the art will appreciate that data blocks (308, 310, 312, 314) do not include this information; rather, data blocks (308, 310, 312, 314) contain actual data of files within the file system (e.g., 100 in FIG. 1).

In one embodiment of the invention, each block pointer (e.g., 302A, 302B, etc.) includes a metaslab ID (318), an offset (320) within the metaslab, a birth time (322) of the block (i.e., data block or indirect block) referenced by the block pointer, and a checksum (324) of the data stored in the referenced block. In one embodiment of the invention, the metaslab ID (318) and offset (320) are used to determine the location of the referenced block in the storage pool. The metaslab ID (318) identifies a particular metaslab. More specifically, the metaslab ID (318) may identify the particular disk within the storage pool upon which the metaslab resides and the location on the disk where the metaslab begins. The offset (320) may then be used to reference a particular segment within the metaslab. In one embodiment of the invention, the data within the segment referenced by the particular metaslab ID (318) and offset (320) may correspond to either a data block or an indirect block. If the data corresponds to an indirect block, then the metaslab ID (318) and offset (320) within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
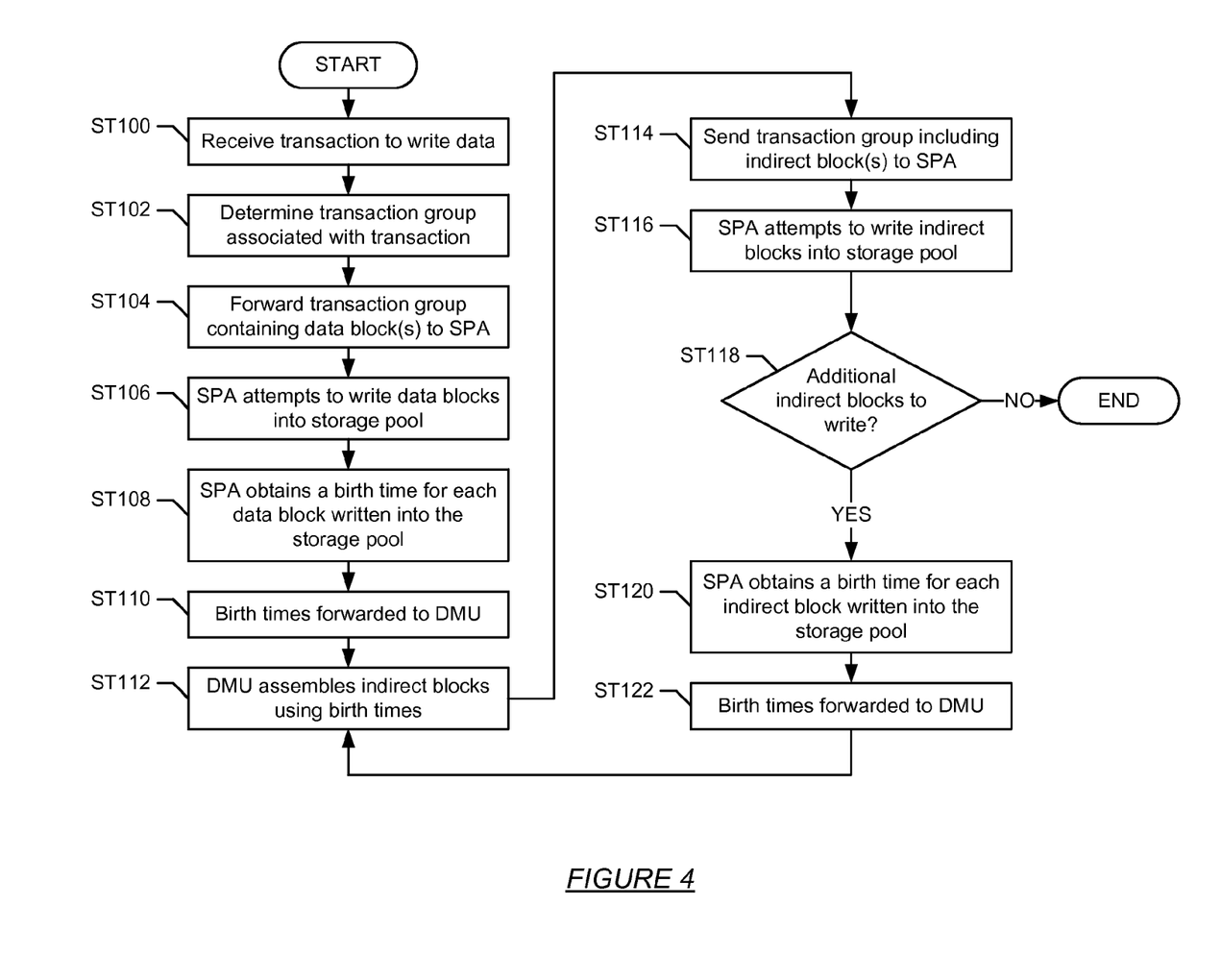
FIG. 4 shows a flow chart in accordance with one embodiment of the invention.

FIG. 4 shows a flow chart in accordance with one embodiment of the invention. More specifically, FIG. 4 shows a flow chart of a method for writing blocks (data blocks and indirect blocks) to disks in the storage pool. Initially, the DMU receives a transaction from an application, the operating system (or a subsystem therein), etc. (ST100). The DMU subsequently determines the transaction group associated with the transaction (ST102). The transaction group is subsequently forwarded to the SPA (ST104). In one embodiment of the invention, the DMU does not determine the transaction group associated with the transaction; rather, the SPA determines the transaction group after receiving the transaction.

In one embodiment of the invention, the transaction includes one or more data blocks and/or one or more indirect blocks. As noted above, the file system is stored on disk using a hierarchical structure including data blocks and indirect blocks. Thus, for a given transaction, the initial transaction group includes I/O requests for the data blocks to be written to disk, while subsequent transaction groups include I/O requests corresponding to the indirect blocks containing one or more block pointers. Accordingly, the transaction group referenced in ST104 includes I/O requests to write data blocks.

Continuing with the discussion of FIG. 4, upon receiving the transaction group including I/O requests to write data blocks from the DMU, the SPA attempts to write the data blocks into the storage pool (ST106). Those skilled in the art will appreciate that if a data block is not written successfully, then the birth time of the block may be stored in a dirty time log (DTL), indicating that the write attempt was not successful. Further, those skilled in the art will appreciate that the birth time(s) stored in the DTL may be equivalent to the birth time(s) that would have been associated with a successful write to disk. Further, those skilled in the art will appreciate that if the write attempt fails, an attempt may be made to store the data block at another location. If the data block is stored in another location, then the DTL may not be updated.

Continuing with the discussion of FIG. 4, if the write attempt is successful, then the SPA subsequently obtains a birth time for each data block written into the storage pool (ST108). Those skilled in the art will appreciate that the birth time(s) used in ST108 are associated with successful write attempts. The birth times are subsequently forwarded to the DMU (ST110). The DMU then assembles the indirect blocks using the birth times (ST112). Specifically, the DMU places the birth time for a given data block in the appropriate block pointer within the indirect block (i.e., the parent indirect block of the data block). Next, the indirect blocks are forwarded to the SPA (ST114). Those skilled in the art will appreciate that the aforementioned indirect blocks (i.e., those blocks assembled in the first iteration of ST112) correspond to the indirect blocks that point directly to the data blocks, via the block pointers (as opposed to indirect blocks that point to other indirect blocks).

Next, the SPA receives and subsequently attempts to write the indirect blocks into the storage pool (ST116). Those skilled in the art will appreciate that if an indirect block is not written successfully, then the birth time of the block may be stored in a dirty time log (DTL), indicating that the write attempt was not successful. Further, those skilled in the art will appreciate that the birth time(s) stored in the DTL may be equivalent to the birth time(s) that would have been associated with a successful write to disk. Further, those skilled in the art will appreciate that if the write attempt fails, an attempt may be made to store the indirect block at another location. If the indirect block is stored in another location, then the DTL may not be updated.

Continuing with the discussion of FIG. 4, if the write attempt is successful, then a determination is then made whether additional indirect blocks exist to write into the storage pool (i.e., whether the last indirect block written to the storage pool corresponds to the root block) (ST118). If no additional indirect blocks exist, then the method is complete. However, if additional indirect blocks exist, then the SPA obtains a birth time for each of the indirect blocks written into the storage pool (ST120). Those skilled in the art will appreciate that the birth time(s) used in ST120 are associated with successful write attempts. The birth time for each of the indirect blocks is subsequently forwarded to the DMU (ST122). Steps ST112 through ST122 are subsequently repeated until the root block is written into the storage pool.

Those skilled in the art will appreciate that updating a DTL if a write attempt fails, as described above, offers fast performance and/or low system overhead, because the DTL is only updated if a write fails. Further, the use of birth times in the DTL minimizes the amount of storage space required to maintain the DTL. In addition, if many writes fail with the same birth time, the DTL only has to be updated once.

Figure 5:
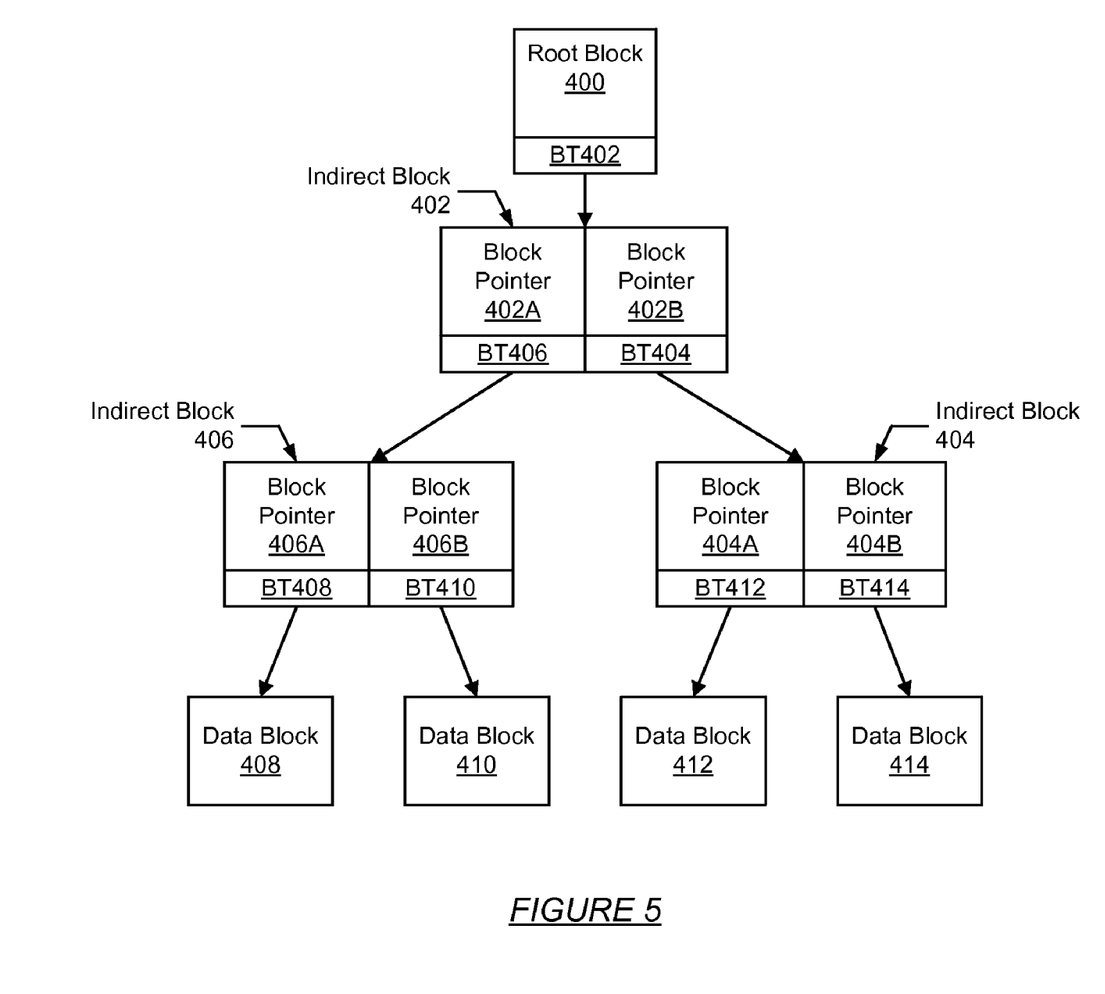
FIG. 5 shows a diagram of a hierarchical data configuration in accordance with one embodiment of the invention.

FIG. 5 shows a diagram of a hierarchical data configuration (hereinafter referred to as a "tree") in accordance with one embodiment of the invention. Specifically, FIG. 5 shows a detailed diagram of the data blocks and indirect blocks resulting from the method described in FIG. 4, in accordance with one embodiment of the invention. Specifically, the file system includes four data blocks (408, 410, 412, 414). Those skilled in the art will appreciate that four data blocks are used for exemplary purposes only; any number of data blocks may be used. Each data block (408, 410, 412, 414) within the file system has a corresponding birth time (BT408, BT410, BT412, BT414, respectively) stored in the corresponding block pointer (406A, 406B, 404A, 404B, respectively). Each of the block pointers (406A, 406B, 404A, 404B) is stored in an indirect block (406, 404). Each indirect block (406, 404) also has a corresponding birth time (BT406, BT404, respectively) stored in a corresponding block pointer (402A, 402B, respectively) in a parent indirect block (402). In this particular example, the indirect block (402) is referenced by a root block (400). The root block (400) includes the birth time (BT402) for the indirect block (402). Those skilled in the art will appreciate that the root block (400) may include birth times for additional indirect blocks (not shown), or for an array of indirect blocks.

Figure 6:
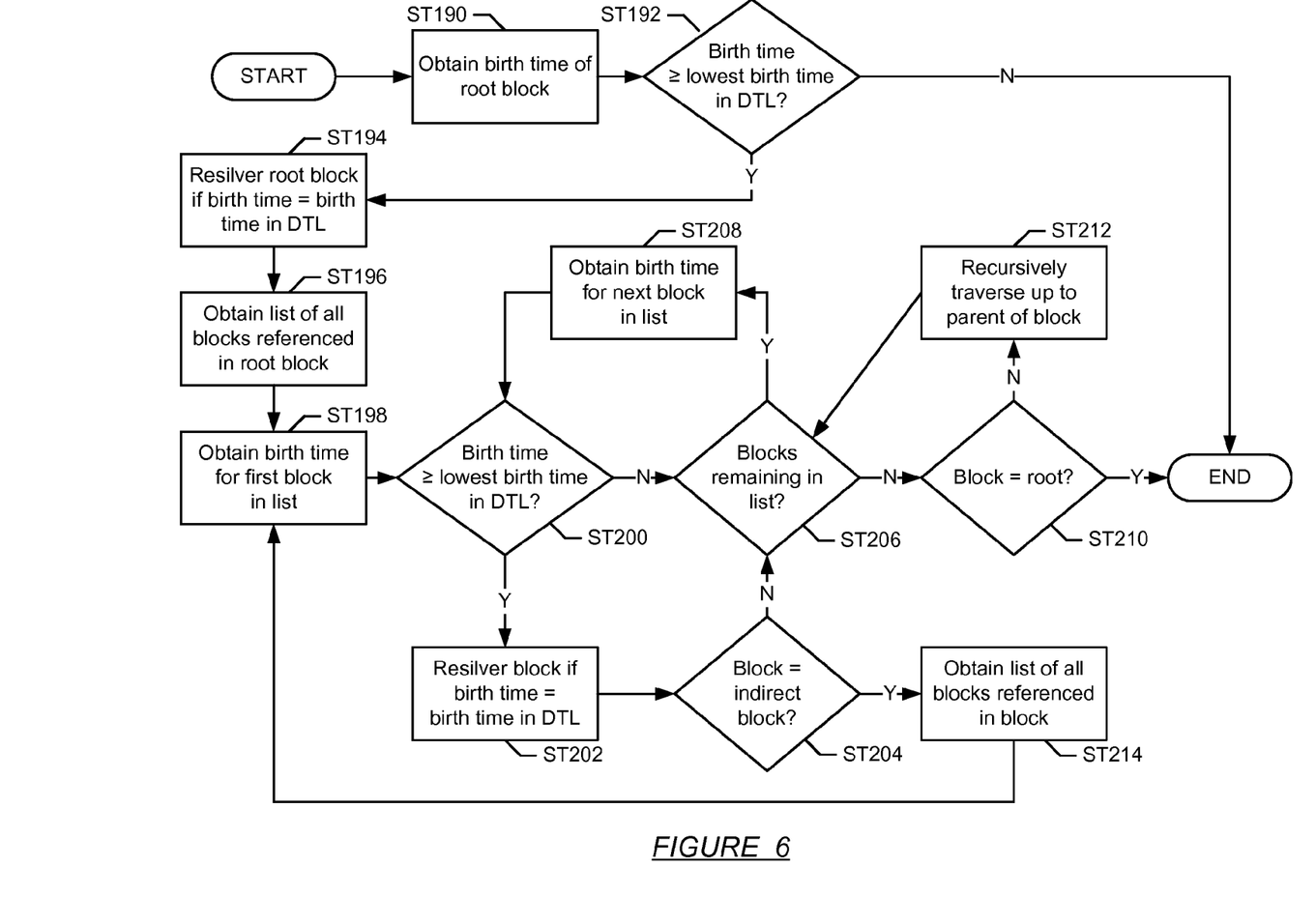
FIG. 6 shows a flow chart in accordance with one embodiment of the invention.

FIG. 6 shows a flow chart in accordance with one embodiment of the invention. More specifically, FIG. 6 shows a flow chart of a method for resilvering a hierarchical block tree (see, e.g., FIG. 5). In general, the flow chart shown in FIG. 6 provides a method for traversing the tree such that only the branches that include (or could possibly include) a block with a birth time listed in a DTL (e.g., a DTL associated with a disk in the storage pool on which the block is stored) are traversed.

Turning to the flow chart of FIG. 6, initially the birth time of the root block is obtained (ST190). A determination is then made about whether the birth time of the root block is greater than or equal to the lowest birth time listed in the DTL (ST192). In other words, because the birth time of the root block is equal to the birth time of the most recently written block in the tree, a determination is made about whether any block in the tree could possibly have a birth time listed in the DTL. If the birth time of the root block is lower than the lowest birth time listed in the DTL, then no blocks in tree could possibly have a birth time listed in the DTL, so no resilvering is required and the process ends.

If the birth time of the root block is greater than or equal to the lowest birth time listed in the DTL, then the process continues. Specifically, the root block is resilvered if the birth time of the root block is listed in the DTL (ST194). Regardless of whether the root block is resilvered, a list of all blocks referenced in the root block is subsequently obtained (ST196). The birth time for the first block on the list is then obtained (ST198), and a determination is made about whether the birth time of the block is greater than or equal to the lowest birth time listed in the DTL (ST200). Those skilled in the art will appreciate that if the birth time of the block is greater than or equal to the lowest birth time listed in the DTL, then the block or one of its children (if any exist) may require resilvering.

If the birth time of the block is greater than or equal to the lowest birth time listed in the DTL, then the block is resilvered if the birth time of the block is listed in the DTL (ST202). Regardless of whether the block is resilvered, a determination is then made about whether the block is an indirect block (ST204). If the block is an indirect block, then a list of all blocks referenced in the block is obtained (ST214) and the method proceeds to ST198, using the newly obtained list.

If the block is not an indirect block (i.e., the block is a data block), or if the birth time of the block is determined in ST200 to be lower than the lowest birth time listed in the DTL, then no further examination of the block or its children (if any exist) is required. Accordingly, a determination is then made about whether there are any blocks remaining in the list (i.e., the list obtained in ST198 or ST214) (ST206). If there are any blocks remaining in the list, then a birth time for the next block in the list is obtained (ST208), and the process proceeds to ST200, using the aforementioned next block.

If there aren't any blocks remaining in the list, then a determination is made about whether the most recently examined block is the root block (ST210). If the most recently examined block is the root block, then no further blocks require examining, so the process ends. Alternatively, if the most recently examined block is not the root block, then the process recursively traverses up the tree to the parent block of the most recently examined block (ST212), and the process proceeds to ST206, using the parent block.

Those skilled in the art will appreciate that the process in FIG. 6 may be applied to any hierarchical block tree in the storage pool.

Figure 7:
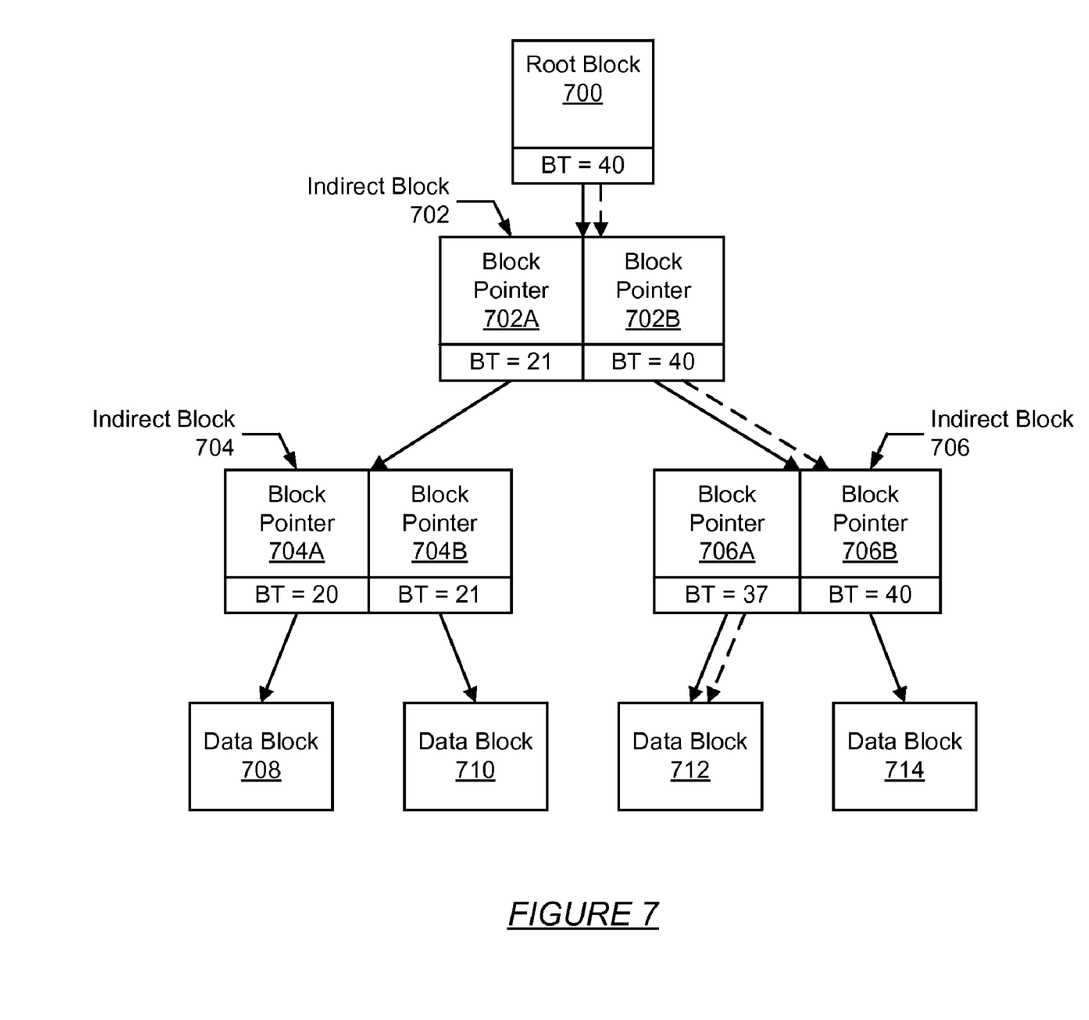
FIG. 7 shows a diagram of a hierarchical data configuration in accordance with one embodiment of the invention.

FIG. 7 shows a diagram of a hierarchical data configuration (hereinafter referred to as a "tree") in accordance with one embodiment of the invention. More specifically, FIG. 7 shows an example of applying the method described in FIG. 6. For the purposes of the example shown in FIG. 7, assume that all the blocks are on a single disk, and that the DTL associated with the disk lists birth times 32-37 (e.g., the disk was offline for transaction groups 32 through 37). Those skilled in the art will appreciate that blocks stored on the disk before transaction group 32 and after transaction group 37 are valid (i.e., they do not require resilvering).

Further, those skilled in the art will appreciate that the blocks in FIG. 7 may be viewed as having parent-child relationships. Namely, the root block (700) is a parent block of indirect block (702), which is in turn a child block of the root block (700). Similarly, indirect blocks (704 and 706) are child blocks of indirect block (702), which is in turn their parent block. Consequently, indirect blocks (704 and 706) are grandchild blocks of the root block (700). Further, data blocks (708 and 710) are child blocks of indirect block (704) and grandchild blocks of indirect block (702). Similarly, data blocks (712 and 714) are child blocks of indirect block (706) and grandchild blocks of indirect block (702).

Accordingly, those skilled in the art will appreciate that in a hierarchical data configuration (e.g., the tree of FIG. 7), any parent-child arrangement of blocks, of any depth, forms a "branch" of the hierarchical data configuration. For example, indirect block (704) and data blocks (708, 710) form a branch of the tree, with indirect block (702) being a parent block of the branch. Further, indirect block (704) and data block (708) alone also form a branch of the tree. More specifically, a branch may include only select blocks, as long as all the blocks in the branch are referenced, directly or indirectly, by the same initial parent block (i.e., parent block of the branch). Those skilled in the art will appreciate that a branch of a hierarchical data configuration need not start at the root block of the configuration, and need not terminate at a leaf block (i.e., a block having no children). Accordingly, if a traversal, resilvering, or other action on a hierarchical data configuration accesses only specific branches of the configuration, then the traversal, resilvering, or other action is a "pruned" action.

The following is a description of steps, in accordance with one embodiment of the invention, that may be taken to resilver the hierarchical block tree shown in FIG. 7. Initially, the birth time (not shown) of the root block (700) is obtained. The birth time is then compared to the birth times listed in the DTL. In this example, assume that the birth time is greater (i.e., later in time) than the birth times listed in the DTL. Accordingly, the root block itself does not require resilvering, but there is a potential that one or more other blocks in the tree require resilvering, so the process must continue.

Next, the birth times for the blocks referenced by the root block are obtained. In this case, the birth time of indirect block (702) is 40, which is greater than the lowest birth time listed in the DTL, so the resilvering process must continue. However, because 40 is not equal to any of the birth times listed in the DTL, indirect block (702) itself does not require resilvering.

A list of blocks referenced by indirect block (702) is then obtained: namely, indirect blocks (704 and 706). The birth time for indirect block (704) is then obtained (i.e., BT=21) and compared to the birth times listed in the DTL. Since birth time 21 is lower than the lowest birth time listed in the DTL, none of the blocks referenced directly or indirectly by block pointer (702A) require resilvering. More specifically, the birth time of indirect block (704) provides assurance that none of the blocks (704, 708, and 710) in the branch were committed to disk after transaction group 21. Accordingly, none of the blocks (704, 708, and 710) in the branch can possibly have a birth time equal to a birth time listed in the DTL.

The birth time for indirect block (706) is then obtained (i.e., BT=40) and compared to the DTL. In this case, because birth time 40 is greater than the lowest birth time listed in the DTL, the process must continue to traverse the branch that includes indirect block (706). Accordingly, a list of blocks referenced by indirect block (706) is then obtained: namely, data blocks (712 and 714). The birth time for data block (712) is then obtained (i.e., BT=37) and compared to the DTL. Because birth time 37 is listed in the DTL, data block (712) requires resilvering, and is resilvered accordingly.

Because there aren't any blocks below data block (712) in the tree, the resilvering process resumes by obtaining the birth time for data block (714) (i.e., BT=40). Since birth time 40 is not listed in the DTL, data block (714) does not require resilvering. Further, because there aren't any blocks below data block (712) in the tree, and there aren't any additional blocks referenced by indirect block (706) to be examined, no further traversal of this branch of the tree is required.

Subsequently, the process recursively traverses to the parent block of indirect block (706) (i.e., indirect block (702)). A determination is then made about whether there are any additional blocks referenced by indirect block (702) to be examined. Because there aren't any additional blocks referenced by indirect block (702) to be examined, the process recursively traverses to the parent block of indirect block (702) (i.e., the root block (700)). Because the parent block is the root block (700), the resilvering process is complete.

Those skilled in the art will appreciate that by using the process in FIG. 6 to resilver a hierarchical block tree, the time and/or system resources required to resilver the tree are significantly reduced. Specifically, less time and/or system resources are required because only those branches of the tree that could potentially include blocks requiring resilvering (i.e., blocks having a birth time listed in the DTL) are traversed.

Figure 8:
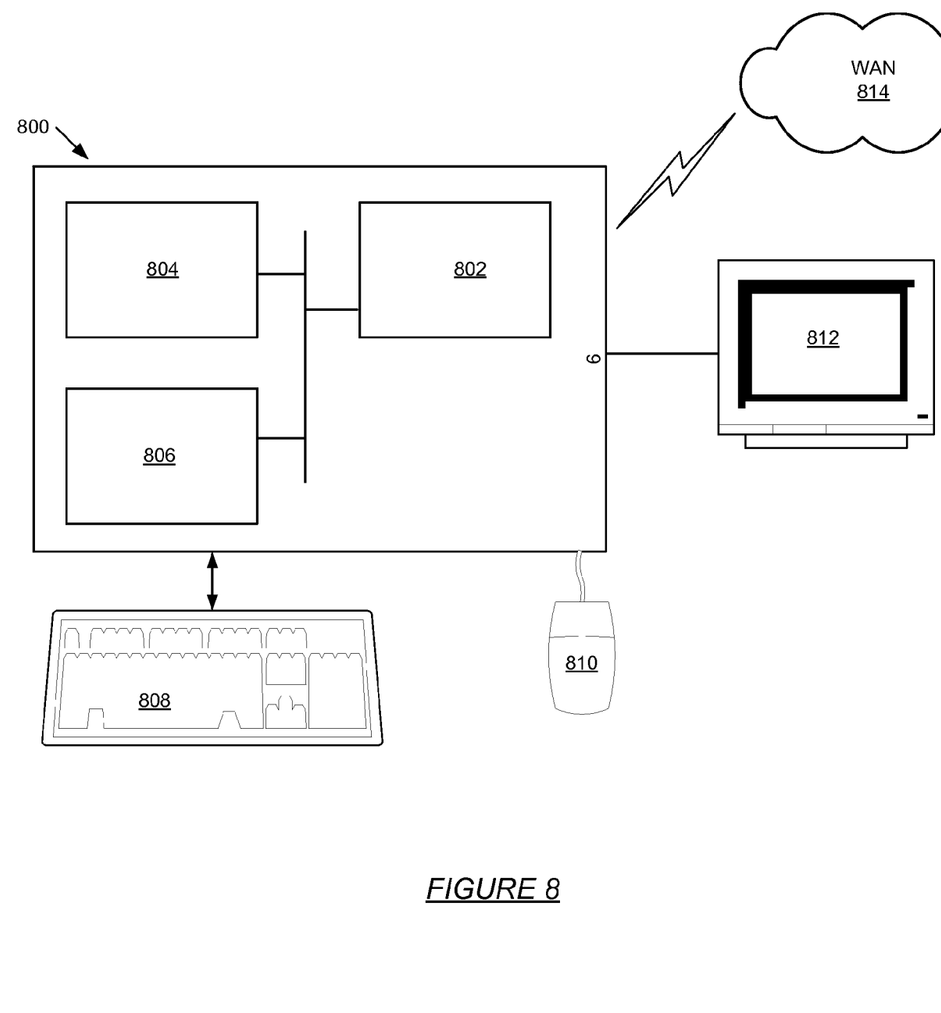
FIG. 8 shows a diagram of a computer system in accordance with one embodiment of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) may be connected to a local area network (LAN) or a wide area network (e.g., the Internet) (814) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., operating system, file system, system call interface, DMU, SPA, storage pool, disk, dirty time log, metaslab allocator, I/O management module, compression module, encryption module, checksum module, root block, data block, indirect block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising executable instructions for resilvering a hierarchical block tree in a storage pool by:
    determining that a birth time of a parent block of a branch of the hierarchical block tree is greater than or equal to a lowest birth time on a dirty time log (DTL);
    using a first checksum to determine that metadata stored in one of a plurality of child indirect blocks is not corrupted;
    selectively traversing the plurality of child indirect blocks in the branch to obtain a child data block, wherein each of the plurality of child indirect blocks comprises a block pointer to a referenced block, a checksum for data stored in the referenced block, and a birth time for the referenced block, wherein the birth time of each of the plurality of child indirect blocks is less than or equal to the birth time of the parent block;
    using a second checksum stored in the one of the plurality of child indirect blocks to determine that data stored in the child data block is not corrupted; and
    resilvering the child data block in the branch when the DTL comprises a birth time of the child data block, wherein the one of the plurality of child indirect blocks comprises the birth time of the child data block.

2. The computer readable medium of claim 1, wherein the birth time of the parent block corresponds to a transaction group associated with an input/output (I/O) request to store the parent block.

3. The computer readable medium of claim 1, wherein the birth time of the child data block corresponds to a transaction group associated with an input/output (I/O) request to store the child data block.

4. The computer readable medium of claim 1, wherein the DTL is associated with a first disk in the storage pool, and wherein resilvering the child data block comprises updating the child block using data from a second disk in the storage pool.

5. The computer readable medium of claim 1, wherein the traversing comprises performing a depth-first traversal of the branch.

6. The computer readable medium of claim 1, further comprising executable instructions for resilvering a hierarchical block tree in a storage pool by:
    resilvering the parent block only if the DTL comprises the birth time of the parent block.

7. A computer readable medium comprising executable instructions for resilvering a hierarchical block tree in a storage pool by:
    obtaining a birth time of each child block of a plurality of child blocks referenced by a parent block in the hierarchical block tree; and
    for each child block:
        a) when the child block is a data block and a dirty time log (DTL) comprises the birth time of the data block:
            using a first checksum to determine that data stored in the child block is not corrupted; and
            resilvering the child block; and
        b) when the child block is an indirect block and the birth time of the indirect block is greater than or equal to a lowest birth time on the DTL:
            using a second checksum to determine that metadata stored in the indirect block is not corrupted;
            selectively traversing the hierarchical block tree to obtain a birth time of each grandchild block referenced by the indirect block, wherein the indirect block comprises a checksum for data stored in each grandchild block; and
        repeating a) and b) for each grandchild block,
        wherein the indirect block comprises the birth time of the data block.

8. The computer readable medium of claim 7, wherein the birth time of each child block corresponds to a transaction group associated with an input/output (I/O) request to store the child block.

9. The computer readable medium of claim 7, wherein the DTL is associated with a first disk in the storage pool, and wherein resilvering the child block comprises updating the child block using data from a second disk in the storage pool.

10. The computer readable medium of claim 7, wherein the birth time of each child block is obtained when the birth time of the parent block is greater than or equal to the lowest birth time on the DTL.

11. The computer readable medium of claim 7, wherein the hierarchical block tree corresponds to a file in a file system.

12. The computer readable medium of claim 7, wherein the birth time of each of the plurality of child blocks is less than or equal to a birth time of the parent block.

13. A computer system comprising:
    a processor;
    a memory;
    a hierarchical block tree in a storage pool, comprising:
        a parent block of a branch of the hierarchical block tree;
        a plurality of child indirect blocks in the branch; and
        a child data block in the branch;
    a dirty time log (DTL); and a file system, wherein at least a portion of the file system is resident in the memory and operating under control of the processor, configured to:
- determine that a birth time of the parent block is greater than or equal to a lowest birth time on the DTL;
- use a first checksum to determine that metadata stored in one of the plurality of child indirect blocks is not corrupted;
- selectively traverse the plurality of child indirect blocks to obtain the child data block, wherein each of the plurality of child indirect blocks comprises a block pointer to a referenced block, a checksum for data stored in the referenced block, and a birth time for the referenced block, wherein the birth time of each of the plurality of child indirect blocks is less than or equal to the birth time of the parent block;
- use a second checksum stored in the one of the plurality of child indirect blocks to determine that data stored in the child data block is not corrupted; and
- resilver the child data block when the DTL comprises a birth time of the child data block, wherein one of the plurality of child indirect blocks comprises the birth time of the child data block.

14. The computer system of claim 13, wherein the birth time of the parent block corresponds to a transaction group associated with an input/output (I/O) request to store the parent block.

15. The computer system of claim 13, wherein the birth time of the child data block corresponds to a transaction group associated with an input/output (I/O) request to store the child data block.

16. The computer system of claim 13, wherein the DTL is associated with a first disk in the storage pool, and wherein resilvering the child data block comprises updating the child data block using data from a second disk in the storage pool.

17. The computer system of claim 13, wherein the file system is configured to traverse the branch by performing a depth-first traversal of the branch.

* * * * *